United States Patent
Casey et al.

(10) Patent No.: US 9,853,455 B1
(45) Date of Patent: Dec. 26, 2017

(54) BATTERY FOR FAULT HANDLING IN BIDIRECTIONAL POWER CONVERSION SYSTEMS

(71) Applicant: X Development LLC, Mountain View, CA (US)

(72) Inventors: Leo Francis Casey, Mountain View, CA (US); Geoff Dolan, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 177 days.

(21) Appl. No.: 14/986,236

(22) Filed: Dec. 31, 2015

(51) Int. Cl.
| | |
|---|---|
| *H02J 1/10* | (2006.01) |
| *H02J 3/46* | (2006.01) |
| *H02J 5/00* | (2016.01) |
| *H02M 7/68* | (2006.01) |

(52) U.S. Cl.
CPC .................. *H02J 5/00* (2013.01); *H02M 7/68* (2013.01)

(58) Field of Classification Search
USPC ....................................................... 307/24, 80
See application file for complete search history.

(56) References Cited

U.S. PATENT DOCUMENTS

| | | | |
|---|---|---|---|
| 6,787,933 B2 | 9/2004 | Claude et al. | |
| 7,057,376 B2 | 6/2006 | Cook et al. | |
| 9,000,612 B2 * | 4/2015 | Choi | H02J 3/383 |
| | | | 307/64 |
| 2004/0155526 A1 * | 8/2004 | Naden | H02J 3/28 |
| | | | 307/43 |
| 2010/0244775 A1 * | 9/2010 | Smith | H02M 3/33584 |
| | | | 320/140 |
| 2010/0314945 A1 * | 12/2010 | Yamazaki | H02M 3/157 |
| | | | 307/80 |
| 2013/0175868 A1 * | 7/2013 | Taurand | H02J 1/00 |
| | | | 307/80 |
| 2013/0234669 A1 * | 9/2013 | Huang | H02J 7/0029 |
| | | | 320/126 |
| 2014/0239985 A1 * | 8/2014 | Sims | H02J 7/042 |
| | | | 324/713 |

(Continued)

FOREIGN PATENT DOCUMENTS

WO    2015155203 A1    10/2015

*Primary Examiner* — Adam Houston
(74) *Attorney, Agent, or Firm* — McDonnell Boehnen Hulbert & Berghoff LLP

(57) ABSTRACT

A power distribution system includes a bidirectional power converter, a battery, and a controller. The bidirectional power converter is operable to (i) convert AC power received at AC terminals to DC power at DC terminals and (ii) convert DC power received at the DC terminals to AC power at the AC terminals. The bidirectional power converter is disposed within a converter stack formed by a plurality of power converters having DC terminals that are coupled to each other in series. The battery is arranged to be selectively couplable to the DC terminals of the bidirectional power converter. The controller is configured to (i) determine that the DC voltage across the DC terminals of the bidirectional power converter is below a threshold voltage and (ii) couple the battery to the DC terminals of the bidirectional power converter based on the determination that the DC voltage is below the threshold voltage.

20 Claims, 9 Drawing Sheets

(56) References Cited

U.S. PATENT DOCUMENTS

| | | | | |
|---|---|---|---|---|
| 2014/0266069 A1* | 9/2014 | Deboy | ............... | H02J 7/0052 |
| | | | | 320/149 |
| 2015/0054343 A1* | 2/2015 | Cui | ............... | H02J 7/00 |
| | | | | 307/66 |
| 2015/0180257 A1* | 6/2015 | Snyder | ............... | H01M 10/441 |
| | | | | 320/103 |
| 2015/0295453 A1* | 10/2015 | Khoshnood | ............... | H02J 5/005 |
| | | | | 307/23 |
| 2015/0365005 A1* | 12/2015 | Panov | ............... | H02M 3/33584 |
| | | | | 307/24 |
| 2016/0164285 A1* | 6/2016 | Elliott | ............... | B60L 11/1887 |
| | | | | 307/9.1 |
| 2016/0254780 A1* | 9/2016 | Ito | ............... | H02S 40/12 |
| | | | | 136/244 |
| 2017/0222434 A1* | 8/2017 | Yoshikoshi | ............... | H02J 1/00 |
| | | | | 307/24 |
| 2017/0222438 A1* | 8/2017 | Magne | ............... | H02J 3/383 |
| | | | | 307/24 |

* cited by examiner

BATTERY FOR FAULT HANDLING IN BIDIRECTIONAL POWER CONVERSION SYSTEMS

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy. Wind energy systems may use turbines that have a rotor coupled to a generator. Incident wind turns the rotor, which rotates a shaft, and the generator can then use the motion of the shaft to generate electricity.

Electrical power transmission and distribution systems distribute electrical energy using networks of conductive lines. Generally, electrical energy is conveyed from energy generation stations to energy consumers.

SUMMARY

Methods and systems for handling faults in bidirectional power conversion systems are described herein. Embodiments described herein may involve utilizing redundant or backup energy storage elements, such as batteries, to account for a variety of fault scenarios in bidirectional power conversion systems.

In one aspect, a power distribution system is disclosed. The power distribution system includes an alternating current (AC) power bus, a direct current (DC) power bus, a bidirectional power converter, a battery, and a controller. The direct current (DC) power bus is electrically coupled to one or more motor-generators. The bidirectional power converter includes AC terminals and DC terminals. The bidirectional power converter is operable to (i) convert AC power received at the AC terminals to DC power at the DC terminals and (ii) convert DC power received at the DC terminals to AC power at the AC terminals. The bidirectional power converter is disposed within a converter stack formed by a plurality of power converters having DC terminals that are coupled to each other in series. The ends of the converter stack define the DC power bus. The battery is arranged to be selectively couplable to the DC terminals of the bidirectional power converter. The controller is configured to determine that the DC voltage across the DC terminals of the bidirectional power converter is below a threshold voltage. The controller is also configured to couple the battery to the DC terminals of the bidirectional power converter based on the determination that the DC voltage is below the threshold voltage.

In another aspect, a method is disclosed. The method involves providing a plurality of bidirectional power converters each operable to (i) in a first mode to convert AC power received at AC terminals to DC power at DC terminals and (ii) in a second mode to convert DC power received at the DC terminals to AC power at the AC terminals. The DC terminals of the plurality of bidirectional power converters are coupled to each other in series to form a converter stack. The ends of the converter stack define a DC power bus. Each bidirectional power converter contributes a respective portion of a voltage of the DC power bus in the first mode. The method also involves determining that a DC voltage across the DC terminals of a particular bidirectional power converter within the converter stack is below a threshold voltage. The method further involves, based on the determination that the DC voltage is below the threshold voltage, (i) causing the particular bidirectional power converter to stop contributing a first portion of the voltage of the DC power bus and (ii) causing a battery to begin contributing the first portion of the DC power bus.

In still another aspect, a converter stack including a plurality of bidirectional power converters is disclosed. A particular bidirectional power converter of the plurality includes AC terminals, DC terminals, a bidirectional power conversion bridge, and a battery. The AC terminals are electrically coupled to an AC power system. The DC terminals are electrically coupled in series with DC terminals of one or more bidirectional power converters in the converter stack. The ends of the converter stack define a DC power bus. The DC terminals of the particular bidirectional power converter contribute a DC voltage to the DC power bus. The bidirectional conversion bridge is configured to (i) convert AC power received at the AC terminals to DC power at the DC terminals and (ii) causing a battery to begin contributing the first portion of the voltage of the DC power bus. The battery is configured to selectively couple to the DC terminals responsive to the DC voltage across the DC terminals being below a threshold voltage.

In yet another aspect, a system is disclosed. The system includes a means for providing a plurality of bidirectional power converters each operable to (i) convert AC power received at AC terminals to DC power at DC terminals and (ii) convert DC power received at the DC terminals to AC power at the AC terminals. The DC terminals of the plurality of bidirectional power converters are coupled to each other in series to form a converter stack. The ends of the converter stack define a DC power bus. Each bidirectional power converter contributes a respective portion of a voltage of the DC power bus. The system also includes a means for determining that a DC voltage across the DC terminals of a particular bidirectional power converter within the converter stack is below a threshold voltage. The system further includes a means for, based on the determination that the DC voltage is below the threshold voltage, (i) causing the particular bidirectional power converter to stop contributing a first portion of the voltage of the DC power bus and (ii) causing a battery to begin contributing the first portion of the voltage of the DC power bus.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
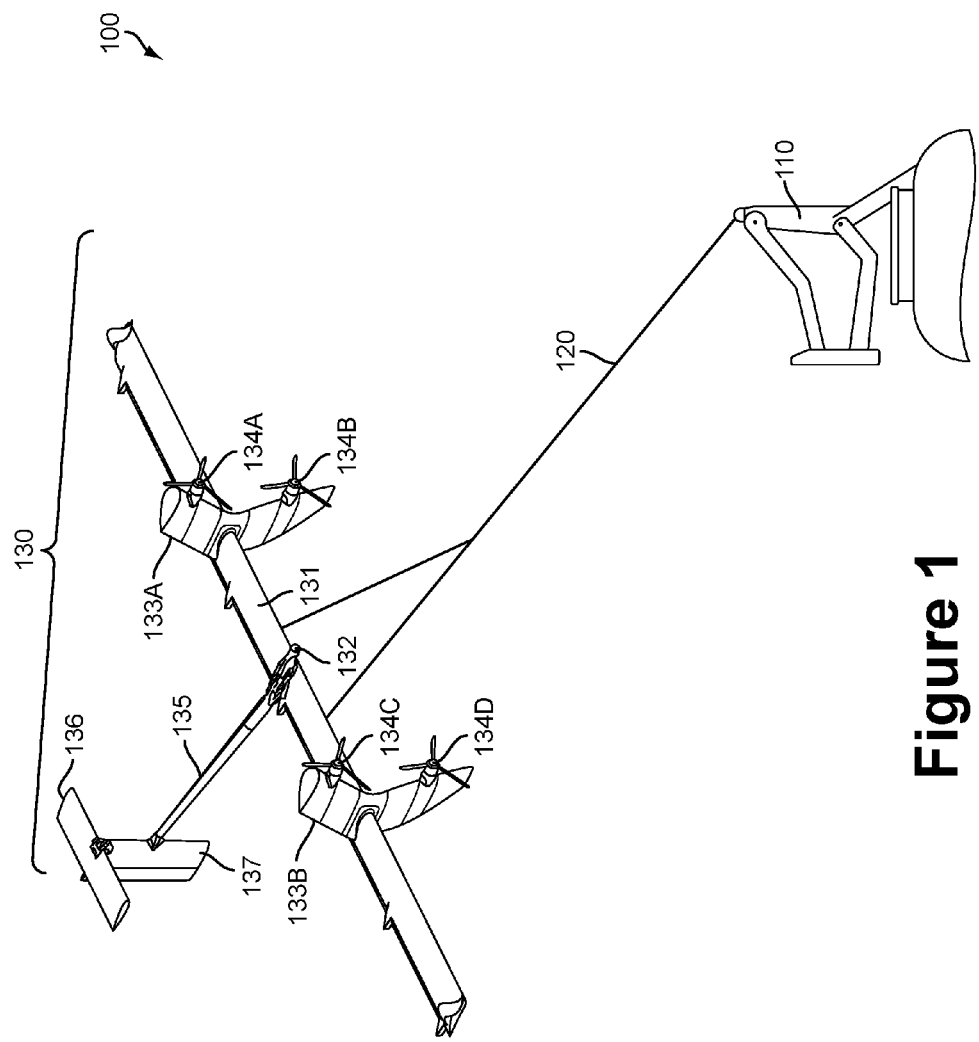
FIG. 1 depicts an Airborne Wind Turbine (AWT), according to an example embodiment.

The following detailed description describes various features and functions of the disclosed systems and methods with reference to the accompanying figures. The illustrative system and method embodiments described herein are not meant to be limiting. It may be readily understood that certain aspects of the disclosed systems and methods can be arranged and combined in a wide variety of different configurations, all of which are contemplated herein.

I. OVERVIEW

Illustrative embodiments relate to fault mitigation in multi-turbine wind-based power generation systems. In particular, illustrative embodiments may relate to or take the form of circuits, batteries, controllers, and/or some combination thereof that may be used to provide a variable-capacity power conversion system.

An example bidirectional power distribution system may include an AC power grid, a bidirectional power converter stack, and a group of motor-generators, among other possible components. In one operational mode—which may be referred to herein as the "motoring" mode—the bidirectional power converter stack may receive AC power from the AC grid, and may convert that AC power into DC power. The generated DC power may energize the motor-generators, causing them to act as motors (which may, for example, cause rotors to rotate and spin up turbines or propellers).

In another operational mode—which may be referred to herein as the "generating" mode—turbines coupled to rotors of the motor-generators may interact with incident wind that causes the turbines to rotate, causing the motor-generators to act as generators. The motor-generators may, with or without additional circuitry, generate DC power. The bidirectional power converter stack may receive the DC power generated by the motor-generators, and may convert that DC power into AC power supplied to the AC power grid.

A bidirectional power converter stack may include a plurality of bidirectional power converters whose DC terminals are electrically connected to each other in series. Each bidirectional power converter may convert AC power into DC power of a particular DC voltage level. By connecting the DC terminals of the bidirectional power converters to each other in series, the DC voltages provided by each bidirectional power converter may be added such that the ends of stack (that is, the outer-most terminals in the series connection) form a total DC voltage representing the sum of the DC voltages provided by each bidirectional power converter. In this manner, a large DC voltage may be produced for driving high-voltage motor-generators, or alternatively high-voltage stacks of motor-generators.

In some instances, the bidirectional power distribution system may form a part of a wind energy system, where the motor-generators are incorporated within an aerial vehicle such as an Airborne Wind Turbine (AWT). An AWT may include an aerial vehicle that flies in a closed path, such as a substantially circular path, to convert kinetic wind energy to electrical energy. In an illustrative implementation, the aerial vehicle may be connected to a ground station via a tether. While tethered, the aerial vehicle can: (i) fly at a range of elevations and substantially along the path, and return to the ground, and (ii) transmit electrical energy to the ground station via the tether.

In the context of the operational modes described above, a "motoring" AWT may perform a powered ascent ("take-off") to place the AWT at an elevation, and/or may perform a powered descent ("landing") to place the aerial vehicle on the ground or coupled to a base station. A "generating" AWT may fly in a path to convert kinetic wind energy into electrical energy. One set of operations may involve the AWT taking off until it reaches a sufficient altitude, at which point the AWT begins generating electricity; at the close of the generating mode, the AWT may perform the powered descent to land the AWT safely on the ground or onto a base station.

Various fault scenarios—when unaccounted for—may present possibilities for the AWT to be damaged. If a fault occurs during the takeoff or landing of an AWT, the AWT may become underpowered, potentially rendering the AWT unable to land safely (e.g., at a safe landing speed). If a fault occurs while the AWTs are generating power, the amount of AC power generated by the wind generation system may drop below an acceptable level (e.g., below operational demands of components connected to the AC power system, below output requirements set forth by regulatory authorities, and/or a sufficiently large drop in DC voltage that affects the performance of the bidirectional power converter stack).

In one example, a bidirectional power converter within the stack may experience a fault that causes the bidirectional power converter to fail or at least be partially inoperable. Such faults may include hardware failures, shorts, opens, problems with switching control signals, and/or an unexpected flaw in a computer program, among other possible faults. As another example, a bidirectional power system operating in the "motoring" mode may experience a total loss of AC power. This may occur if the AC power grid loses power, if the bidirectional power converter stack disconnects from the AC power, and/or if the bidirectional power converter stack becomes damaged or otherwise fails. In these various fault scenarios, a loss of power—even from a single bidirectional power converter—may lead to an inability to safely land the AWT (without damaging the AWT or its components).

In some embodiments, a bidirectional power conversion system may include one or more batteries that serve as a source of backup power when a fault occurs. A battery may be coupled with the DC terminals of a bidirectional power converter through one or more switches that allow the battery to be selectively connected to those DC terminals. During normal operation, the battery may be disconnected from the DC terminals. However, if the bidirectional power converter experiences a fault that reduces the voltage it drives across the DC terminals, the battery may be connected across the DC terminals (through the switch) such that the battery begins to drive the voltage across the DC terminals. When the bidirectional power converter and battery combination are a part of a converter stack, this switch to battery power maintains the DC voltage across the converter stack (i.e., the DC bus voltage).

While the battery is providing power to the converter stack, the faulted bidirectional power converter may be serviced (either remotely, serviced on-site, or physically removed or replaced). In some cases, such as when the aerial vehicle is motoring up to elevation or down to the ground, the triggering of the battery backup may cause the aerial vehicle to begin descending so that it may safely land. In this manner, the battery may serve as a temporary power source of a sufficient capacity to allow the power conversion system to safely end its operation.

In some embodiments, one or more batteries (or other power storage elements) may be incorporated within the bidirectional power converter itself. The battery may be coupled to the DC terminals in a similar manner as the external battery example described above. In some implementations, the battery may be connected to the DC terminals through a buck converter, boost converter, a buck-boost converter, or any other DC-DC converter. Such DC-DC voltage conversion may be performed when the battery's voltage is different from the designed output voltage of the DC terminals of the bidirectional power converter (where the conversion scales the DC voltage to approximately the same level as nominal AC-to-DC power conversion). Regardless of the particular implementation, the battery (or batteries) may be couplable to the DC terminals through one or more switching devices.

Circuitry for charging a battery may be included within various power conversion systems. For example, such charging circuitry may divert excess power not consumed by the load (e.g., the motor-generators) to one or more batteries. The voltage across the batteries may be measured, and power may be provided to those batteries to maintain the voltage at a level indicative of a fully-charged battery. Such excess power storage may be performed during "motoring" when the motor-generators draw less power than available from the AC source, and/or during "generation" when the motor-generators produce excess power (e.g., too high voltage, too much current, etc.). Some power conversion systems may incorporate a controller that monitors battery charge levels and motor-generator power consumption In some instances, failure of a bidirectional power converter may cause a break in the DC series connection within the bidirectional power converter stack. In these circumstances, the power converter stack may be configured to allow individual bidirectional power converters to be bypassed, along with allowing individual batteries to be connected to the converter stack. Such a configuration may be implemented using a combination of switches. This bypass technique may be combined with batteries to implement a power conversion system that is more robust and capable of sustaining operation in the event of a fault or failure.

In various implementations, dynamic power control techniques (which may include fault mitigation, compliance with grid operations, etc.) may be designed to comply with regulations set forth by regulatory agencies, agreements between power suppliers and power consumers, and/or other design goals (e.g., related to system uptime, limits on the rate of change on the power supplied by a system, etc.). As renewable energy sources become increasingly incorporated within large-scale power systems, certain requirements may be set forth to maintain the integrity and continuous operation of those large-scale power systems. Unlike other typical energy sources, some renewable resources, such as wind, are non-constant. Various dynamic power control techniques described herein may be implemented to account for such fluctuations in power output in spite of the non-constant nature of wind, thereby enabling a bidirectional power conversion to operate in accordance with various operational requirements.

As described herein, a "battery" may refer to any device capable of storing electrical charge. Some batteries may be electrochemical cells (e.g., lithium-ion, lead-acid, alkaline, etc.) that store electrical charge in the form of chemical energy, and which includes a cathode and anode through which electrical power may be provided to and/or drawn from. Other batteries may be electrical storage devices, such as capacitors (e.g., electrolytic, supercapacitors, etc.), which store electrical energy as electric potential in a dielectric. Some batteries may be single-use batteries, while others may be rechargeable. In some instances, a "battery" may refer to a device that incorporates circuitry to facilitate the charging and/or discharging of an energy storage element.

As described herein, a "bidirectional power converter" may include circuit components to facilitate conversion between AC power and DC power. In some instances, a bidirectional power converter may include transformers, isolation barriers, switching bridges, filters, switching protection, sensors, buck converters, boost converters, sensors, other power supply elements, and/or any combination thereof. During AC-to-DC conversion, a bidirectional power converter may rectify and filter an AC signal. During DC-to-AC conversion, a bidirectional power converter may invert a DC signal into an AC signal of some frequency (e.g., 50 or 60 Hz) having any number of phases (e.g., two phases or three phases). Various bidirectional power converters may include control inputs that enable aspects of the converter's operation to be adjusted, such as output voltage levels (either on the AC side or DC side).

As described herein, a "motor-generator" may be any electromechanical device capable of converting between electrical energy and kinetic energy. A motor-generator may include a stator, a rotor, inductive windings, magnets, electronic components (such as drivers), and/or any combination thereof. Note that a motor-generator may any kind of motor or generator, including induction based motor-generators, permanent magnet based motor-generators, brushed DC motors-generators, brushless DC motor-generators, or any other kind of motor or generator. A motor-generator may be operable to rotate a rotor through magnetic induction or electromagnetic force in response to receiving electrical power. A motor-generator may also be operable to generate electrical power in response to being rotated by another device (e.g. a turbine coupled to the rotor). Additionally, a "motor-generator" may refer to a device that incorporates both mechanical elements and electronic components that facilitate the operation of the motor-generator, sense the operational condition of the motor-generator (e.g., "healthy" or "faulted," among other possible operational conditions), and/or enable modification of operational parameters of the motor-generator (e.g., "motoring" mode, "generating" mode, and/or configuring the manner in which the motor-generator operates).

As described herein, a "fault" may be any kind of failure or problem that affects the operation of a device. A fault may refer to an electronic component experiencing a high voltage or a large current that causes the device to operate differently than its intended use (e.g., causes the device to act as a short, an open, or affects other operational parameters of the device such that it performs substantially differently than its intended design). A fault may also refer to a problem during the execution of software or firmware that causes a device to behave in some unintended way (e.g., a software bug, firmware malfunction, etc.). A fault may additionally refer to a change in an environmental condition that causes a device's operation to depart from its nominal operation (e.g., loss of AC power from the grid causes the bidirectional power converter to stop operating, causing its DC voltage output to drop). It should be understood that, generally speaking, a "fault" refers to any departure from normal, expected, or designed operation that may affect the operation of the power conversion system and/or its constituent components.

It should be understood that the above examples are provided for illustrative purposes, and should not be construed as limiting. As such, the method may additionally or alternatively include other features or include fewer features, without departing from the scope of this application.

II. EXAMPLE SYSTEMS

FIG. 1 depicts an AWT 100, according to an example embodiment. In particular, the AWT 100 includes a ground station 110, a tether 120, and an aerial vehicle 130. As shown in FIG. 1, the aerial vehicle 130 may be connected to the tether 120, and the tether 120 may be connected to the ground station 110. In this example, the tether 120 may be attached to the ground station 110 at one location on the ground station 110, and attached to the aerial vehicle 130 at two locations on the aerial vehicle 130. However, in other examples, the tether 120 may be attached at multiple locations to any part of the ground station 110 and/or the aerial vehicle 130.

The ground station 110 may be used to hold and/or support the aerial vehicle 130 until it is in an operational mode. The ground station 110 may also be configured to allow for the repositioning of the aerial vehicle 130 such that deploying of the device is possible. Further, the ground station 110 may be further configured to receive the aerial vehicle 130 during a landing. The ground station 110 may be formed of any material that can suitably keep the aerial vehicle 130 attached and/or anchored to the ground while in hover flight, forward flight, crosswind flight.

In addition, the ground station 110 may include one or more components (not shown), such as a winch, that may vary a length of the tether 120. For example, when the aerial vehicle 130 is deployed, the one or more components may be configured to pay out and/or reel out the tether 120. In some implementations, the one or more components may be configured to pay out and/or reel out the tether 120 to a predetermined length. As examples, the predetermined length could be equal to or less than a maximum length of the tether 120. Further, when the aerial vehicle 130 lands in the ground station 110, the one or more components may be configured to reel in the tether 120.

The tether 120 may transmit electrical energy generated by the aerial vehicle 130 to the ground station 110. In addition, the tether 120 may transmit electricity to the aerial vehicle 130 in order to power the aerial vehicle 130 for takeoff, landing, hover flight, and/or forward flight. The tether 120 may be constructed in any form and using any material which may allow for the transmission, delivery, and/or harnessing of electrical energy generated by the aerial vehicle 130 and/or transmission of electricity to the aerial vehicle 130. The tether 120 may also be configured to withstand one or more forces of the aerial vehicle 130 when the aerial vehicle 130 is in an operational mode. For example, the tether 120 may include a core configured to withstand one or more forces of the aerial vehicle 130 when the aerial vehicle 130 is in hover flight, forward flight, and/or crosswind flight. The core may be constructed of any high strength fibers. In some examples, the tether 120 may have a fixed length and/or a variable length. For instance, in at least one such example, the tether 120 may have a length of 140 meters.

The aerial vehicle 130 may be configured to fly substantially along a path to generate electrical energy. The term "substantially along," as used in this disclosure, refers to exactly along and/or one or more deviations from exactly along that do not significantly impact generation of electrical energy as described herein and/or transitioning an aerial vehicle between certain flight modes as described herein.

The aerial vehicle 130 may include or take the form of various types of devices, such as a kite, a helicopter, a wing and/or an airplane, among other possibilities. The aerial vehicle 130 may be formed of solid structures of metal, plastic and/or other polymers. The aerial vehicle 130 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction. Other materials may be possible as well.

As shown in FIG. 1, the aerial vehicle 130 may include a main wing 131, a front section 132, rotor connectors 133A-B, rotors 134A-D, a tail boom 135, a tail wing 136, and a vertical stabilizer 137. Any of these components may be shaped in any form which allows for the use of components of lift to resist gravity and/or move the aerial vehicle 130 forward.

The main wing 131 may provide a primary lift for the aerial vehicle 130. The main wing 131 may be one or more rigid or flexible airfoils, and may include various control surfaces, such as winglets, flaps, rudders, elevators, etc. The control surfaces may be used to stabilize the aerial vehicle 130 and/or reduce drag on the aerial vehicle 130 during hover flight, forward flight, and/or crosswind flight.

The main wing 131 may be any suitable material for the aerial vehicle 130 to engage in hover flight, forward flight, and/or crosswind flight. For example, the main wing 131 may include carbon fiber and/or e-glass. Moreover, the main wing 131 may have a variety dimensions. For example, the main wing 131 may have one or more dimensions that correspond with a conventional wind turbine blade. As another example, the main wing 131 may have a span of 8 meters, an area of 4 meters squared, and an aspect ratio of 15. The front section 132 may include one or more components, such as a nose, to reduce drag on the aerial vehicle 130 during flight.

The rotor connectors 133A-B may connect the rotors 134A-D to the main wing 131. In some examples, the rotor connectors 133A-B may take the form of or be similar in form to one or more pylons. In this example, the rotor connectors 133A-B are arranged such that the rotors 134A-D are spaced between the main wing 131. In some examples, a vertical spacing between corresponding rotors (e.g., rotor 134A and rotor 134B or rotor 134C and rotor 134D) may be 0.9 meters.

The rotors 134A-D may configured to drive one or more generators for the purpose of generating electrical energy. In this example, the rotors 134A-D may each include one or more blades, such as three blades. The one or more rotor blades may rotate via interactions with the wind and which could be used to drive the one or more generators. In addition, the rotors 134A-D may also be configured to provide a thrust to the aerial vehicle 130 during flight. With this arrangement, the rotors 134A-D may function as one or more propulsion units, such as a propeller. Although the rotors 134A-D are depicted as four rotors in this example, in other examples the aerial vehicle 130 may include any number of rotors, such as less than four rotors or more than four rotors.

The tail boom 135 may connect the main wing 131 to the tail wing 136. The tail boom 135 may have a variety of dimensions. For example, the tail boom 135 may have a length of 2 meters. Moreover, in some implementations, the tail boom 135 could take the form of a body and/or fuselage of the aerial vehicle 130. And in such implementations, the tail boom 135 may carry a payload.

The tail wing 136 and/or the vertical stabilizer 137 may be used to stabilize the aerial vehicle and/or reduce drag on the aerial vehicle 130 during hover flight, forward flight, and/or crosswind flight. For example, the tail wing 136 and/or the vertical stabilizer 137 may be used to maintain a pitch of the aerial vehicle 130 during hover flight, forward flight, and/or crosswind flight. In this example, the vertical stabilizer 137 is attached to the tail boom 135, and the tail wing 136 is located on top of the vertical stabilizer 137. The tail wing 136 may have a variety of dimensions. For example, the tail wing 136 may have a length of 2 meters. Moreover, in some examples, the tail wing 136 may have a surface area of 0.45 meters squared. Further, in some examples, the tail wing 136 may be located 1 meter above a center of mass of the aerial vehicle 130.

While the aerial vehicle 130 has been described above, it should be understood that the methods and systems described herein could involve any suitable aerial vehicle that is connected to a tether, such as the tether 120.

B. Example Components of an AWT

Figure 2:
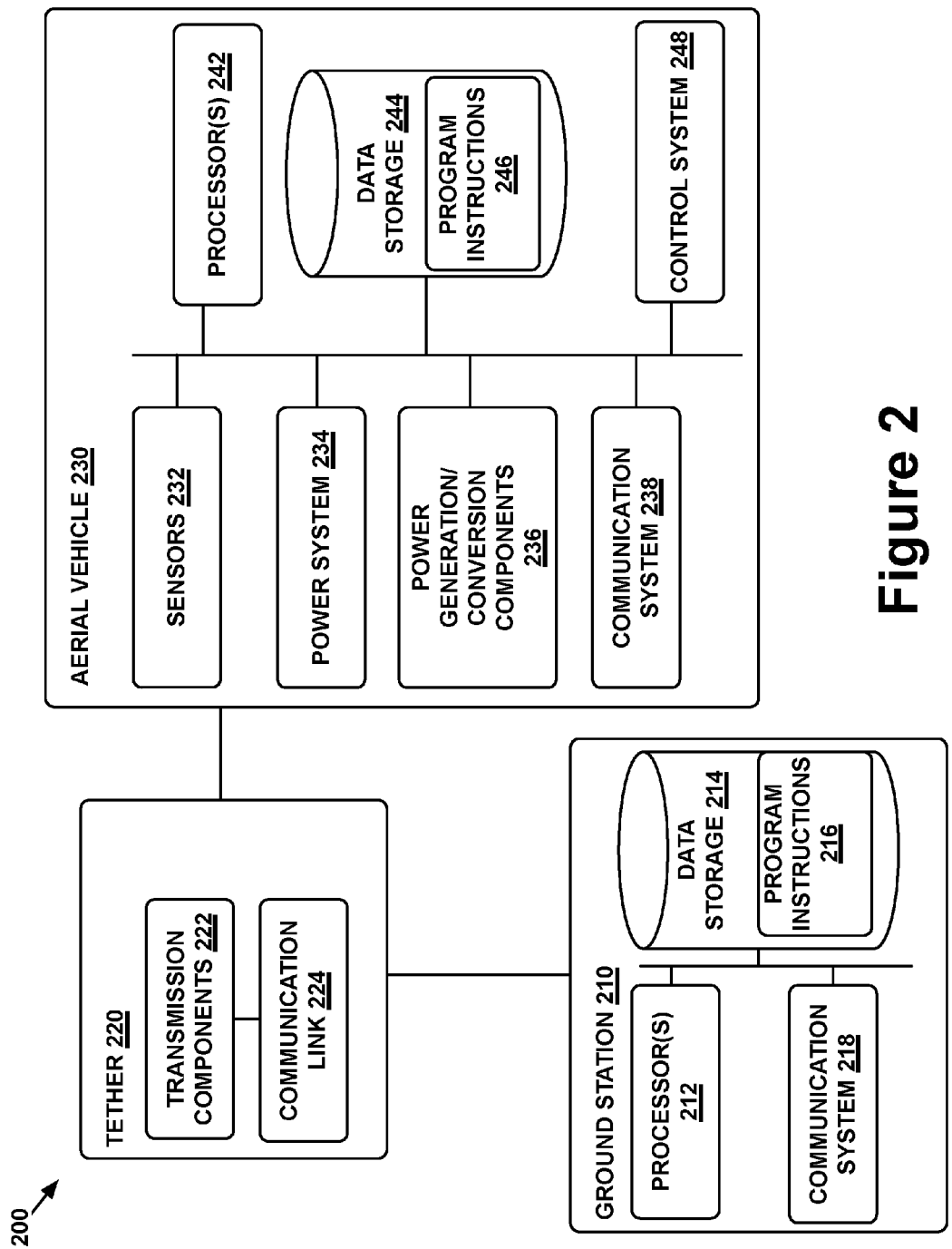
FIG. 2 is a simplified block diagram depicting components of an AWT, according to an example embodiment.

FIG. 2 is a simplified block diagram illustrating components of the AWT 200. The AWT 200 may take the form of or be similar in form to the AWT 100. In particular, the AWT 200 includes a ground station 210, a tether 220, and an aerial vehicle 230. The ground station 210 may take the form of or be similar in form to the ground station 110, the tether 220 may take the form of or be similar in form to the tether 120, and the aerial vehicle 230 may take the form of or be similar in form to the aerial vehicle 130.

As shown in FIG. 2, the ground station 210 may include one or more processors 212, data storage 214, and program instructions 216. A processor 212 may be a general-purpose processor or a special purpose processor (e.g., digital signal processors, application specific integrated circuits, etc.). The one or more processors 212 can be configured to execute computer-readable program instructions 216 that are stored in a data storage 214 and are executable to provide at least part of the functionality described herein.

The data storage 214 may include or take the form of one or more computer-readable storage media that may be read or accessed by at least one processor 212. The one or more computer-readable storage media can include volatile and/or non-volatile storage components, such as optical, magnetic, organic or other memory or disc storage, which may be integrated in whole or in part with at least one of the one or more processors 212. In some embodiments, the data storage 214 may be implemented using a single physical device (e.g., one optical, magnetic, organic or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 210. As such, the data storage 214 may include program instructions to perform or facilitate some or all of the functionality described herein.

In a further respect, the ground station 210 may include a communication system 218. The communications system 218 may include one or more wireless interfaces and/or one or more wireline interfaces, which allow the ground station 210 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. The ground station 210 may communicate with the aerial vehicle 230, other ground stations, and/or other entities (e.g., a command center) via the communication system 218.

In an example embodiment, the ground station 210 may include communication systems 218 that allows for both short-range communication and long-range communication. For example, the ground station 210 may be configured for short-range communications using Bluetooth and for long-range communications under a CDMA protocol. In such an embodiment, the ground station 210 may be configured to function as a "hot spot"; or in other words, as a gateway or proxy between a remote support device (e.g., the tether 220, the aerial vehicle 230, and other ground stations) and one or more data networks, such as cellular network and/or the Internet. Configured as such, the ground station 210 may facilitate data communications that the remote support device would otherwise be unable to perform by itself.

For example, the ground station 210 may provide a Wi-Fi connection to the remote device, and serve as a proxy or gateway to a cellular service provider's data network, which the ground station 210 might connect to under an LTE or a 3G protocol, for instance. The ground station 210 could also serve as a proxy or gateway to other ground stations or a command station, which the remote device might not be able to otherwise access.

Moreover, as shown in FIG. 2, the tether 220 may include transmission components 222 and a communication link 224. The transmission components 222 may be configured to transmit electrical energy from the aerial vehicle 230 to the ground station 210 and/or transmit electrical energy from the ground station 210 to the aerial vehicle 230. The transmission components 222 may take various different forms in various different embodiments. For example, the transmission components 222 may include one or more conductors that are configured to transmit electricity. And in at least one such example, the one or more conductors may include aluminum and/or any other material which allows for the conduction of electric current. Moreover, in some implementations, the transmission components 222 may surround a core of the tether 220 (not shown).

The ground station 210 could communicate with the aerial vehicle 230 via the communication link 224. The communication link 224 may be bidirectional and may include one or more wired and/or wireless interfaces. Also, there could be one or more routers, switches, and/or other devices or networks making up at least a part of the communication link 224.

Further, as shown in FIG. 2, the aerial vehicle 230 may include one or more sensors 232, a power system 234, power generation/conversion components 236, a communication system 238, one or more processors 242, data storage 244, and program instructions 246, and a control system 248.

The sensors 232 could include various different sensors in various different embodiments. For example, the sensors 232 may include a global a global positioning system (GPS) receiver. The GPS receiver may be configured to provide data that is typical of well-known GPS systems (which may be referred to as a global navigation satellite system (GNNS)), such as the GPS coordinates of the aerial vehicle 230. Such GPS data may be utilized by the AWT 200 to provide various functions described herein.

As another example, the sensors 232 may include one or more wind sensors, such as one or more pitot tubes. The one or more wind sensors may be configured to detect apparent and/or relative wind. Such wind data may be utilized by the AWT 200 to provide various functions described herein.

Still as another example, the sensors 232 may include an inertial measurement unit (IMU). The IMU may include both an accelerometer and a gyroscope, which may be used together to determine the orientation of the aerial vehicle 230. In particular, the accelerometer can measure the orientation of the aerial vehicle 230 with respect to earth, while the gyroscope measures the rate of rotation around an axis, such as a centerline of the aerial vehicle 230. IMUs are commercially available in low-cost, low-power packages. For instance, the IMU may take the form of or include a miniaturized MicroElectroMechanical System (MEMS) or a NanoElectroMechanical System (NEMS). Other types of IMUs may also be utilized. The IMU may include other sensors, in addition to accelerometers and gyroscopes, which may help to better determine position. Two examples of such sensors are magnetometers and pressure sensors. Other examples are also possible.

While an accelerometer and gyroscope may be effective at determining the orientation of the aerial vehicle 230, slight errors in measurement may compound over time and result in a more significant error. However, an example aerial vehicle 230 may be able mitigate or reduce such errors by using a magnetometer to measure direction. One example of a magnetometer is a low-power, digital 3-axis magnetometer, which may be used to realize an orientation independent electronic compass for accurate heading information. However, other types of magnetometers may be utilized as well.

The aerial vehicle 230 may also include a pressure sensor or barometer, which can be used to determine the altitude of the aerial vehicle 230. Alternatively, other sensors, such as sonic altimeters or radar altimeters, can be used to provide an indication of altitude, which may help to improve the accuracy of and/or prevent drift of the IMU.

As noted, the aerial vehicle 230 may include the power system 234. The power system 234 could take various different forms in various different embodiments. For example, the power system 234 may include one or more batteries for providing power to the aerial vehicle 230. In some implementations, the one or more batteries may be rechargeable and each battery may be recharged via a wired connection between the battery and a power supply and/or via a wireless charging system, such as an inductive charging system that applies an external time-varying magnetic field to an internal battery and/or charging system that uses energy collected from one or more solar panels.

As another example, the power system 234 may include one or more motors or engines for providing power to the aerial vehicle 230. In some implementations, the one or more motors or engines may be powered by a fuel, such as a hydrocarbon-based fuel. And in such implementations, the fuel could be stored on the aerial vehicle 230 and delivered to the one or more motors or engines via one or more fluid conduits, such as piping. In some implementations, the power system 234 may be implemented in whole or in part on the ground station 210.

As noted, the aerial vehicle 230 may include the power generation/conversion components 236. The power generation/conversion components 326 could take various different forms in various different embodiments. For example, the power generation/conversion components 236 may include one or more generators, such as high-speed, direct-drive generators. With this arrangement, the one or more generators may be driven by one or more rotors, such as the rotors 134A-D. And in at least one such example, the one or more generators may operate at full rated power wind speeds of 11.5 meters per second at a capacity factor which may exceed 60 percent, and the one or more generators may generate electrical power from 40 kilowatts to 600 megawatts.

Moreover, as noted, the aerial vehicle 230 may include a communication system 238. The communication system 238 may take the form of or be similar in form to the communication system 218. The aerial vehicle 230 may communicate with the ground station 210, other aerial vehicles, and/or other entities (e.g., a command center) via the communication system 238.

In some implementations, the aerial vehicle 230 may be configured to function as a "hot spot"; or in other words, as a gateway or proxy between a remote support device (e.g., the ground station 210, the tether 220, other aerial vehicles) and one or more data networks, such as cellular network and/or the Internet. Configured as such, the aerial vehicle 230 may facilitate data communications that the remote support device would otherwise be unable to perform by itself.

For example, the aerial vehicle 230 may provide a WiFi connection to the remote device, and serve as a proxy or gateway to a cellular service provider's data network, which the aerial vehicle 230 might connect to under an LTE or a 3G protocol, for instance. The aerial vehicle 230 could also serve as a proxy or gateway to other aerial vehicles or a command station, which the remote device might not be able to otherwise access.

As noted, the aerial vehicle 230 may include the one or more processors 242, the program instructions 244, and the data storage 246. The one or more processors 242 can be configured to execute computer-readable program instructions 246 that are stored in the data storage 244 and are executable to provide at least part of the functionality described herein. The one or more processors 242 may take the form of or be similar in form to the one or more processors 212, the data storage 244 may take the form of or be similar in form to the data storage 214, and the program instructions 246 may take the form of or be similar in form to the program instructions 216.

Moreover, as noted, the aerial vehicle 230 may include the control system 248. In some implementations, the control system 248 may be configured to perform one or more functions described herein. The control system 248 may be implemented with mechanical systems and/or with hardware, firmware, and/or software. As one example, the control system 248 may take the form of program instructions stored on a non-transitory computer readable medium and a processor that executes the instructions. The control system 248 may be implemented in whole or in part on the aerial vehicle 230 and/or at least one entity remotely located from the aerial vehicle 230, such as the ground station 210. Generally, the manner in which the control system 248 is implemented may vary, depending upon the particular application.

III. EXAMPLE SYSTEMS

Figure 3A:
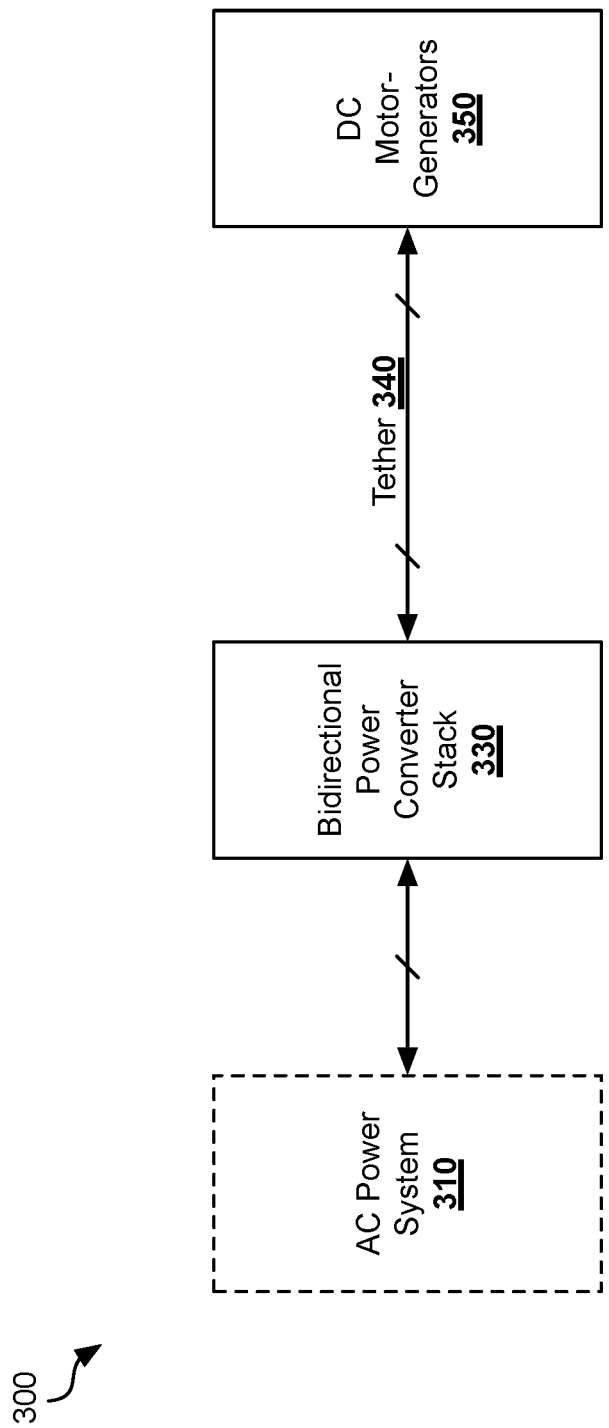
FIG. 3A is a simplified block diagram illustrating a bidirectional power conversion system, according to an example embodiment.

FIG. 3A is a simplified block diagram illustrating a bidirectional power conversion system 300, according to an example embodiment. The bidirectional power conversion system 300 includes AC power system 310, bidirectional power converter stack 330, tether 340, and DC motor-generators 350. The bidirectional power converter stack 330 may, in one operational mode, perform AC-to-DC power conversion from the AC power system 310 to the DC motor-generators 350 via the tether 340. The bidirectional power converter stack 330 may also, in another operational mode, perform DC-to-AC power conversion from the DC motor-generators 350 (via the tether 340) to the AC power system 310. Although not illustrated in FIG. 3A, the bidirectional power conversion system 300 may include other components, such as intermediate conversion circuitry (which may be included within a subsystem such as ground station 210) between the bidirectional power converter stack 330 and the DC motor-generators 350.

The AC power system 310 may be any combination of hardware and/or software components that collectively form a power system that operates using AC power. The AC power system 310 may be a set of outlets, terminals, or other components that other devices may connect to for drawing AC power. The AC power system 310 may also be a power grid, from which AC power is drawn and/or to which AC power is provided.

The AC power system 310 may operate according to a particular AC power scheme. For example, AC power system 310 may operate in three phases at 120 V with a frequency of 60 Hz. Other AC power systems may also be implemented. The AC power system 310 may provide such multi-phase AC power to the bidirectional power converter stack 330 via, for example, one or more physical wire connections.

The bidirectional power converter stack 330 may be any combination of hardware and/or software components that collectively perform bidirectional power conversion. In one direction, the bidirectional power converter stack 330 may receive AC power from the AC power system 310, which it converts to DC power that is delivered to the tether 340. The bidirectional power converter stack 330 may be comprised of one or more bidirectional power converters—such as bidirectional power converter 320 depicted in FIG. 3B—coupled to each other in series to form a converter stack (e.g., as shown in FIG. 3C).

The bidirectional power converter stack 330 may be designed or configured to receive a particular type of AC power (e.g., of a particular peak-to-peak voltage, a particular amount of current, with a particular frequency, etc.), which it converts to a particular type of DC power (e.g., a particular DC voltage level). In some implementations, the bidirectional power converter stack 330 may be configurable to adjust its operation. For example, the bidirectional power converter stack 330 may receive an input that designates a DC voltage level output (using, for example, a configurable buck-boost converter). As another example, the bidirectional power converter stack 330 may be configurable to receive and/or provide AC power of a particular type.

The tether 340 may be any physical connection capable of conveying DC power between the bidirectional power converter stack 330 and the DC motor-generators 350. In some examples, the tether 340 may be attached to an aerial vehicle to provide both a mechanical link to the aerial vehicle, as well as a medium through which electrical power is transmitted to and/or from the DC motor-generators 350. The tether 340 may also be configured to carry one or more informational signals (either digital data or analog waveforms) that may be provided to other components, such as the bidirectional power converter stack 330, a controller, a computing device, etc. These informational signals could be sensor measurements that detect, among other things, failures or faults of components within the aerial vehicle, such as the failure of a motor-generator.

The DC motor-generators 350 may be any combination of electromechanical devices that are capable of receiving power to magnetically drive a rotor and of generating power by spinning up the rotor. Any number of motor-generators may be connected to each other, in any combination of series or parallel connections, in order to form the DC motor-generators 350. The DC motor-generators 350 may operate in two different "modes": a motoring mode and a generating mode. In the motoring mode, the DC motor-generators 350 may draw electric power from the tether 340, which cause the motor-generators to act as motors that drive a load (e.g., turbines coupled to rotors of the motor-generators). The amount of power drawn by the DC motor-generators 350 from the tether 340 may depend on a variety of factors, including the instantaneous speed of the turbines. In the generating mode, the DC motor-generators 350 may receive kinetic power (from, for example, wind that spins up turbines coupled to the DC motor-generators 350) and convert that power into electric power that is sent along the tether 340 to devices connected thereto.

The DC motor-generators 350 may be designed to operate within a particular voltage range, and may be rated to withstand certain transient voltages and/or certain sustained voltages. The configuration of the DC motor-generators 350—that is, the manner in which they are connected to each other and to the tether 340, may be such that each motor-generator receives voltage within its designed tolerances during normal operation. For example, if the tether 340 carries a DC voltage of 2000 V, and each motor-generator is designed to operate at or around 500 V, then a possible configuration for the DC motor-generators 350 is to have four motor-generators connected to each other in series. If each motor-generator is instead designed to operate at or around 1000 V, then a possible configuration for the DC motor-generators 350 would be to have two sets of two series-connected motor-generators that are connected in parallel (such that each set of series-connected motor-generators receives the 2000 V tether voltage). A variety of DC motor-generators 350 configurations may be possible; it should be understood that the configurations may depend on a variety of factors, including the operational voltage or voltages of the tether 340, the operational voltage ranges of the motor-generators, and/or the number of motor-generators within the DC motor-generators 350, among other possible factors.

Figure 3B:
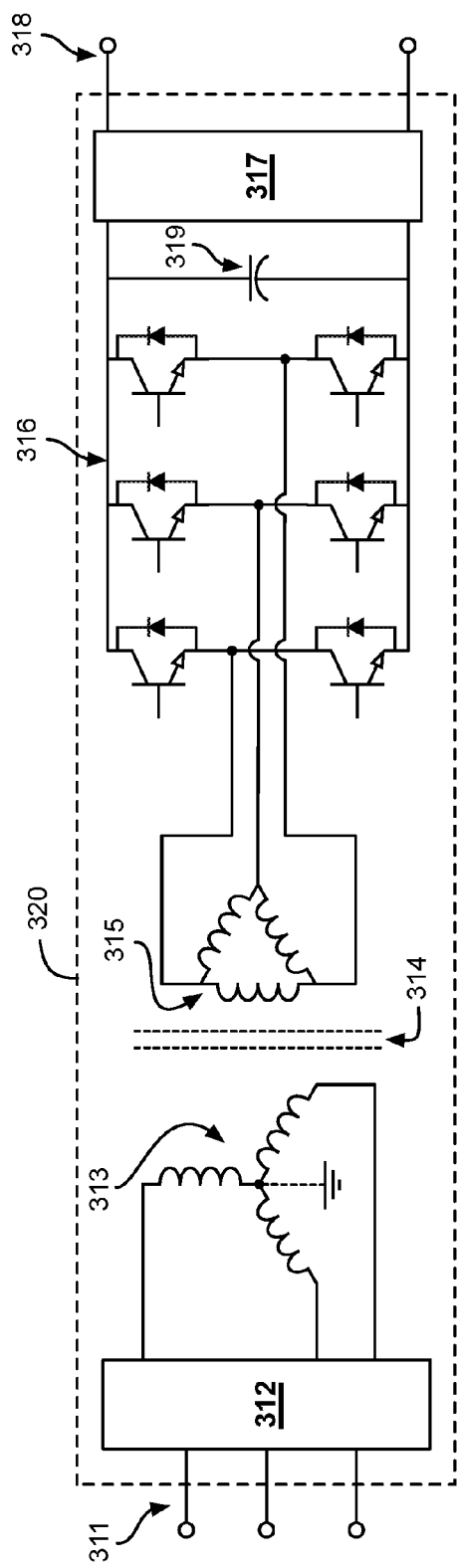
FIG. 3B is a schematic diagram of a bidirectional power converter, according to an example embodiment.
Figure 3C:
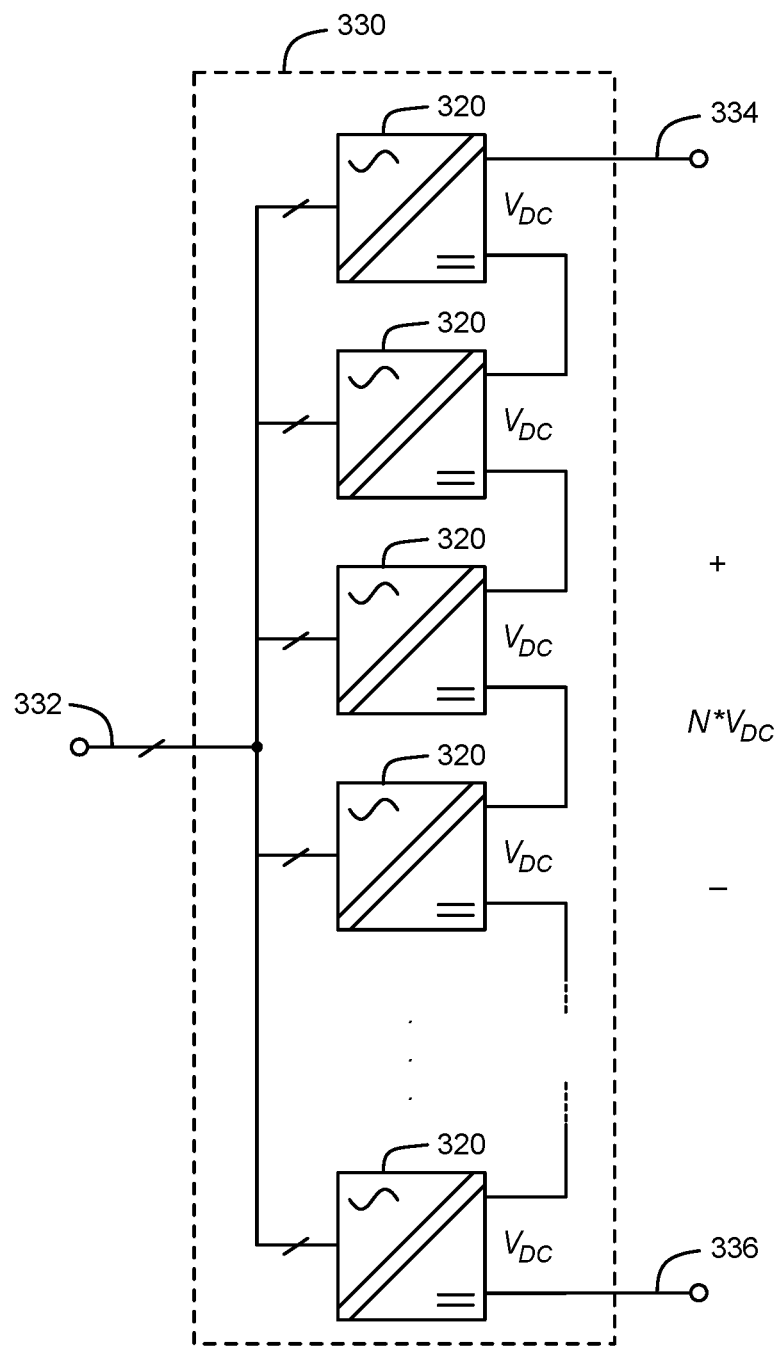
FIG. 3C is a schematic diagram of a bidirectional power converter stack, according to an example embodiment.

FIG. 3B is a schematic diagram of a bidirectional power converter 320, according to an example embodiment. The bidirectional power converter 320 interfaces with three-phase AC power at the AC terminals 311 and with DC power at the DC terminals 318. The bidirectional power converter 320 may operate in at least two modes, including an AC-to-DC mode and a DC-to-AC mode.

In the AC-to-DC mode, the bidirectional power converter 320 receives AC power at the AC terminals 311, which is provided to AC-side circuitry 312. The AC-side circuitry 312 may include electronic components for switching protection, filtering, voltage sensing, overvoltage protection, overcurrent protection, and/or electronic components for other purposes. The AC-side circuitry 312 then outputs an AC signal to a three-phase isolation section, which includes a transformer formed by the inductive elements 313, the dielectric barrier 314, and the inductive elements 315. In various implementations, the three-phase isolation section may step-up or step-down the peak-to-peak voltage, depending on the desired output voltage at the DC terminals 318. The isolated AC signal output by the inductive elements 315 are then provided to the three-phase switching bridge 316, which rectifies the AC signal into a DC signals. That DC signal may then be smoothed out by the capacitor at the output of the three-phase switching bridge 316. The DC signal is then provided to the DC-side circuitry 317, which may include may include electronic components for switching protection, filtering, voltage sensing, overvoltage protection, overcurrent protection, and/or electronic components for other purposes. The output of the DC-side circuitry 317 may be a DC signal that is output at the DC terminals 318.

In the reverse direction (i.e., in the DC-to-AC mode), the bidirectional power converter 320 receives DC power at the DC terminals 318, which flows through the DC-side circuitry 317 and is provided to the three-phase switching bridge 316. The three-phase switching bridge 316, in combination with the inductive elements 315, may act as an inverter to generate an AC signal based on the DC power. That AC signal may then flow across the three-phase isolation section and into the AC-side circuitry 312. The output of the AC-side circuitry 312 may be provided to the AC terminals 311.

Note that the bidirectional power converter 320 may contain additional components to facilitate the AC-to-DC conversion and/or the DC-to-AC conversion. For example, a bidirectional power converter 320 may include a controller and/or a processor that carries out instructions to operate the bidirectional power converter 320. For example, the switches in the three-phase switching bridge 316 may be controlled by such a controller or processor in order to generate an AC signal of a desired frequency and/or of a desired voltage.

FIG. 3C is a schematic diagram of a bidirectional power converter stack 330, according to an example embodiment. The bidirectional power converter stack 330 is formed from a set of bidirectional power converters (e.g., bidirectional power converter 320). In the example configuration depicted in FIG. 3C, the DC outputs of the bidirectional power converters 320 are tied to each other in series, such that the DC output voltage $V_{DC}$ from each bidirectional power converter contributes to the overall voltage of the DC bus, which is defined by DC lines 334, 336. In this example configuration, there are N number of bidirectional power converters in the stack; therefore, the DC bus voltage across DC lines 334, 336 is $N*V_{DC}$.

Each bidirectional power converter receives an AC voltage from the AC line 332. The AC line 332 may be, for example, an AC mains voltage line from a grid or other power source (e.g., 120 V RMS AC voltage at 60 Hz, 240 V RMS AC voltage at 50 Hz, etc.). There may be any number of phases in the AC line 332 (e.g., 2 phase AC voltage, 3 phase AC voltage, etc.), and each of those phases may be coupled to its own distinct line within the AC line 332. In FIG. 3C, the AC line 332 may be formed by multiple distinct lines, as denoted by the slash in the AC line 332.

When power flows from the AC side to the DC side (in FIG. 3C, from left to right), the properties of the AC voltage may be defined by an AC power grid, an AC mains line, or another AC power source connected to the AC line 332. In some instances, the AC voltage may possess properties that are compatible with the AC inputs on the bidirectional power converters in the stack. When power flows from the DC side to the AC side (in FIG. 3C, from right to left), the properties of the AC voltage may be defined by the manner of operation of the bidirectional power converters in the stack. For instance, the bidirectional power converters may include circuitry and control that facilitates the conversion from a DC voltage to a time-varying AC voltage; thus, the properties of the AC voltage may be defined by operational aspects of the bidirectional power converters. Furthermore, the bidirectional power converters may be configurable to change the properties of the AC voltage signals that they output; for example, a bidirectional power converter may include a controller with pre-set configurations for different AC voltage standards.

The bidirectional power converter stack 330 may be grounded at a number of different locations. The bidirectional power converter stack 330 may be grounded at the DC line 334, such that the DC bus voltage ranges from 0 V to $-N*V_{DC}$. The bidirectional power converter stack 330 may also be grounded at the DC line 336, such that the DC bus voltage ranges from $-N*V_{DC}$ to 0 V. In some implementations, the bidirectional power converter stack 330 may be grounded at some intermediate point between the DC lines 334, 336 such that the DC bus voltage ranges from some positive voltage to some negative voltage (relative to ground), where the difference between the DC lines 334, 336 is equal to $N*V_{DC}$.

The particular grounding technique and configuration may vary among implementations and/or operational conditions. For instance, grounding the bidirectional power converter stack 330 at a center point between the DC lines 334, 336 may reduce the maximum voltage stresses experienced by the components within the converters and/or components connected to the DC bus. In various implementations, electronic components may be rated to safely operate within particular DC voltage ranges, and the center grounding may allow for the bidirectional power converter stack 330 to be implemented with such electronic components. Furthermore, the center grounding may reduce voltage stresses on the isolation barriers of the bidirectional power converters (as compared to the voltage stresses experienced by the isolation barriers when the bidirectional power converter stack 330 is grounded at a DC bus line 334 or 336). In some instances, the DC side may not be grounded at all (i.e., "floating"), and is instead limited using voltage clamps or the like.

Additionally, in some implementations, the DC side grounding may be an impedance ground. Such impedance grounding may be implemented in order to limit the current flowing to ground in the event of a fault. The electrical component or components may also be monitored (e.g., voltage across them, current flowing through them, etc.), which may serve as a basis for detecting faults.

The AC side of the bidirectional power converter stack 330 may be referenced to earth ground (e.g., through a neutral line, via voltage clamps or surge arrestors, etc.). The AC ground referencing may be an "artificial" neutral grounding (e.g., a fourth "ground" phase in a three-phase AC system) that at least permits leakage or transient currents to be routed to ground.

During various fault scenarios, the manner of grounding may be altered dynamically, either as a result of the fault itself or as an intended result of some fault mitigation process. For example, if a particular bidirectional power converter in the stack fails whose DC line was serving as a reference to ground, the loss of the ground reference may leave the system susceptible to damage from transient currents that have no path to ground. Additionally, the loss of the ground reference may cause the DC lines to have unpredictable DC bias voltages (e.g., on the order of the RMS voltage of the AC voltage). Such DC voltage drifts may impose stresses on the isolation barriers of the bidirectional power converters, which could in turn could put those bidirectional power converters at risk of failing.

Thus, it should be understood that the location of a ground reference of the bidirectional power converter stack 330, if present, may vary depending on the design of the system and the circumstances of its operation.

Figure 3D:
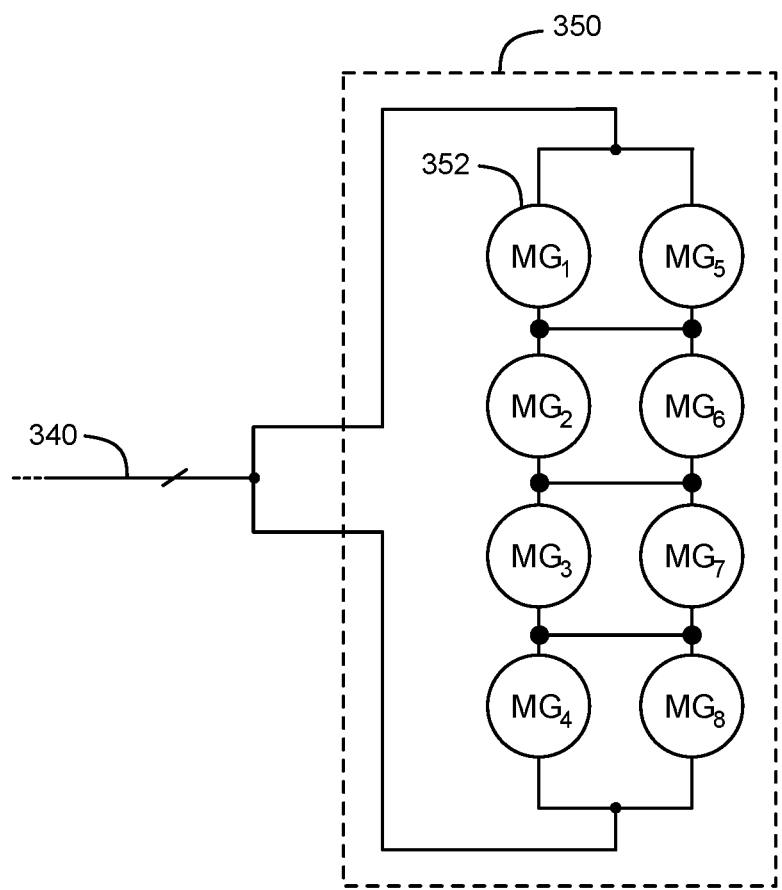
FIG. 3D is a schematic diagram of an example motor-generator configuration, according to an example embodiment.

FIG. 3D is a schematic diagram of an example motor-generator configuration 350, according to an example embodiment. The DC motor-generators 350 may be coupled to the tether 340, which may serve as a transmission medium through which DC power is supplied to the DC motor-generators 350 and/or to which power from the DC motor-generators 350 is provided to other components connected to the tether 340.

Any number of motor-generators may be included within the DC motor-generators 350. The number of motor-generators may depend upon, for example, the particular design of the AWT that houses the DC motor-generators 350. Additionally, the manner in which the DC motor-generators are configured (e.g., how they are coupled to each other and/or the tether 340) may depend on the tether 340 voltage and/or a desired amount of redundancy of the system.

In the example depicted in FIG. 3D, eight motor generators form the DC motor-generators 350. Four motor-generators—$MG_1$, $MG_2$, $MG_3$, and $MG_4$—are connected to each other in series. The other four motor-generators—$MG_5$, $MG_6$, $MG_7$, and $MG_8$—are also connected to each other in series. The two sets of series connected motor-generators are connected to each other in parallel, with the parallel connection locations coupled to opposite ends of the tether 340 carrying DC power. Additionally, the negative terminals of $MG_1$ and $MG_5$ are connected, the negative terminals of $MG_2$ and $MG_6$ are connected, and the negative terminals of $MG_3$ and $MG_7$ are connected.

The tether 340 may include two conductive lines that are coupled to DC lines 334, 336. The top of the motor-generator stack (the node shared by $MG_1$ and $MG_5$) may be connected to one of the DC lines 334, 336, while the bottom of the motor-generator stack (the node shared by $MG_4$ and $MG_8$) may be connected to the other DC line 334, 336. As one example implementation, the DC lines 334, 336 may have a voltage potential of 3400 V across them; in this example, each motor-generator may operate at 850 V, such that a series of four motor-generators can safely receive the 3400 V.

It should be understood that the configurations, schematics, and circuit topologies depicted in FIGS. 3A, 3B, 3C, and 3D are merely examples and are provided for explanatory purposes. Some components may be added, removed, or replaced with alternative components in order to form a bidirectional power conversion system. It should be understood that fault tolerance techniques, fault mitigation techniques, safety improvements, and/or compliance maintenance techniques described herein could be applied to any kind of power conversion system beyond those explicitly disclosed herein.

IV. EXAMPLE BATTERY-BASED FAULT HANDLING CONFIGURATIONS

A. Battery External to the Bidirectional Power Converter

Figure 4A:
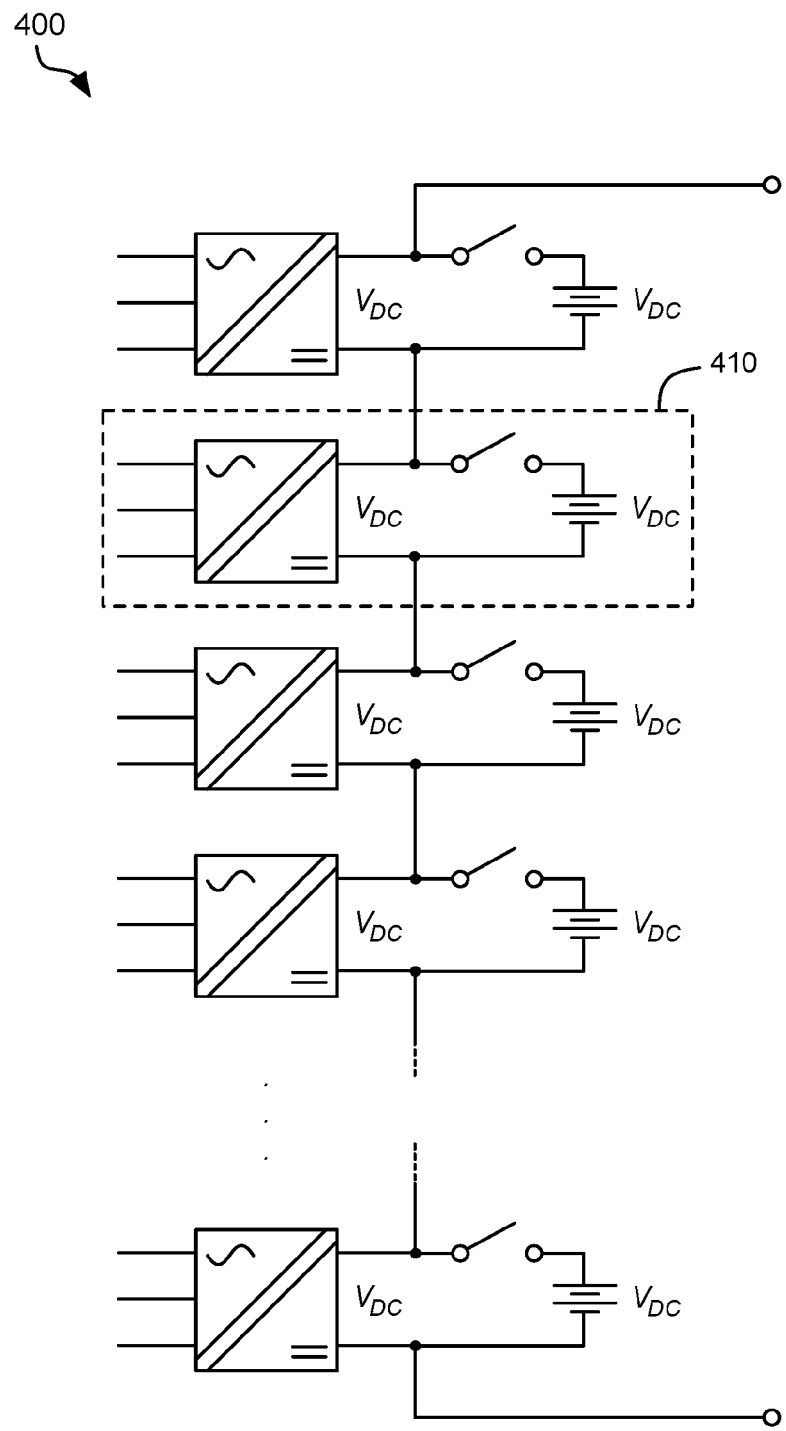
FIG. 4A is a schematic diagram of a bidirectional power converter stack with batteries, according to an example embodiment.

FIG. 4A is a schematic diagram of a bidirectional power converter stack with batteries 400, according to an example embodiment. The bidirectional power converter stack with batteries 400 may be similar in operation and design to the bidirectional power converter stack 330 illustrated in FIG. 3C; however, in this configuration, batteries are coupled to each bidirectional power converter in the stack through a switch, with the collective bidirectional power converter, switch, and battery forming a converter assembly 410. Although FIG. 4A illustrates a bidirectional power converter stack with batteries coupled to each converter (i.e., at a 1:1 ratio between the number of converters and the number of batteries), other configurations may include fewer or more batteries relative to the number of bidirectional power converters.

During normal operation (i.e., no-fault operation) in which bidirectional power converter stack 400 is supplying DC voltage, the batteries may all be disconnected from their respective bidirectional power converters, such that the DC voltage bus is powered solely by the bidirectional power converters. However, upon the occurrence of a fault, one or more of the switches may be activated in order to mitigate the fault.

In one fault scenario, a single bidirectional power converter may experience a fault (e.g., a component may be shorted or damaged that affects its operation), such that its operation is impaired. In some instances, this impairment may result in a loss or drop of DC output voltage of the bidirectional power converter. As a result, the overall voltage of the DC bus also drops. This drop in DC voltage may impair the operation of devices that utilize the DC bus, such as the DC motor-generators.

To handle such a fault, a battery in parallel with the faulted bidirectional power converter may be coupled to the series DC stack through the switch. As one simple example, the DC voltage of a battery may be approximately the same voltage as the DC output of its corresponding bidirectional power converter. In this example, upon the occurrence of a bidirectional power converter fault, the associated battery may be coupled to the stack through a conducting switch to compensate for the voltage loss experienced by the stack. For instance, if the bidirectional power converter is designed to output 400 V, the loss of that 400 V contribution to the DC bus voltage may be compensated for by connecting a 400 V battery to the stack.

In other implementations, the battery alone may provide a different voltage compared to its associated bidirectional power converter. For example, a 12 V battery might be associated with a 400 V DC output bidirectional power converter. In this example, additional circuitry may up-convert the 12 V battery output to at or near 400 V (e.g., through a buck-boost converter), such that connected the up-converted battery output to the stack adequately compensates for the loss of the bidirectional power converter voltage. An example voltage converter is depicted in FIG. 4D.

In some implementations, two or more batteries may be combined in order to provide a sufficient current, voltage, and/or charge. For example, devices connected to the DC bus may draw more current than a single battery is capable of providing; in this example, two or more batteries may be coupled to each other in parallel in order to provide for adequate current throughput. In another example, two or more batteries may be connected to each other in series in order to increase the effective output voltage of the parallel-connected backup batteries. As one example, if the desired output is 48 V, then four 12 V batteries may be connected to each other in series. Any combination of batteries, connected to each other in series and/or parallel, may be utilized depending upon the particular implementation; it should be understood that a single battery in parallel with a given bidirectional power converter is illustrated for explanatory purposes, and might represent a combination of batteries or other power sources and/or voltage converters.

Figure 4B:
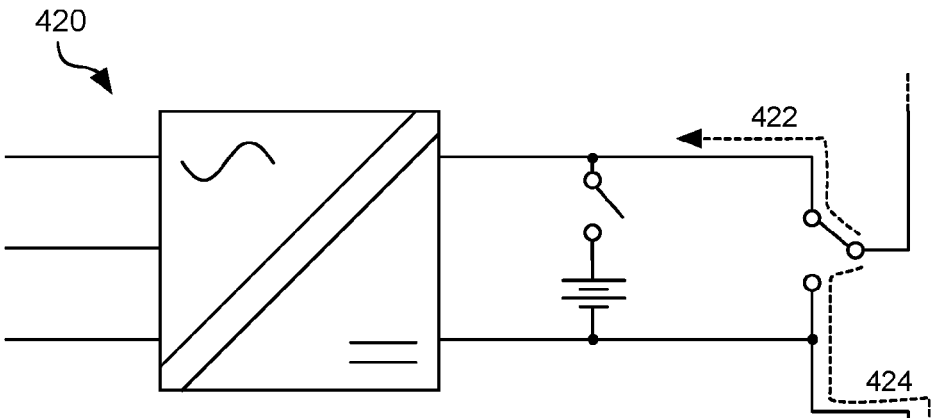
FIG. 4B is a schematic diagram of an example configuration of a bidirectional power converter with a battery, according to an example embodiment.
Figure 4C:
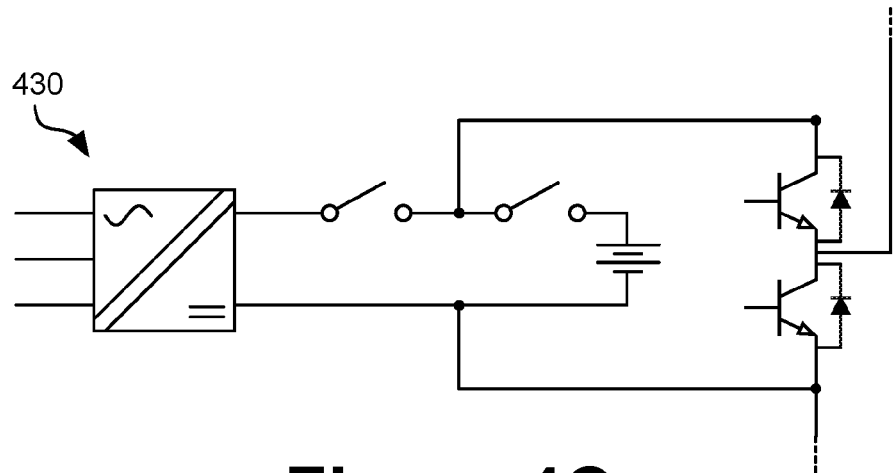
FIG. 4C is a schematic diagram of another example configuration of a bidirectional power converter with a battery, according to an example embodiment.
Figure 4D:
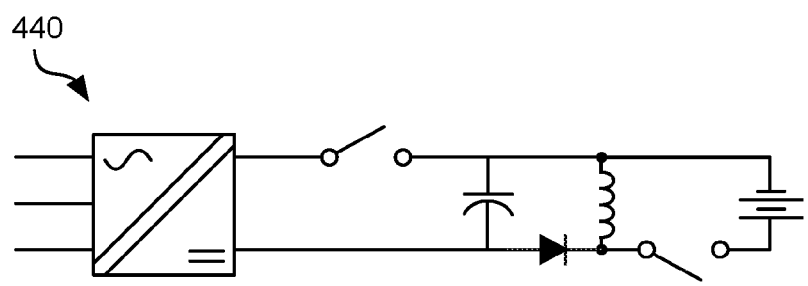
FIG. 4D is a schematic diagram of an example configuration of a bidirectional power converter with a voltage converter, according to an example embodiment.

FIGS. 4B and 4C illustrate example converter assemblies that could be implemented in place of converter assembly 410 in FIG. 4A. FIG. 4B is a schematic diagram of an example configuration 420 of a bidirectional power converter with a battery, according to an example embodiment. In this example configuration 420, a battery is connected in parallel with the bidirectional power converter through a switch. This switch may be a contact-based switching device, such as a relay, or a solid state device, such as a solid-state relay or transistor.

The entire converter assembly 420 may be connected to a converter stack through a switch that operates in two modes. In mode 422, current conducts through the switch to the bidirectional power converter and/or the battery (depending on whether the battery switch is conducting or not). Mode 422 may be activated so long as the bidirectional power converter does not compromise the operation of the converter stack (e.g., if the bidirectional power converter provides a shorted path to ground). In mode 424, current conducts through the switch down to the next converter assembly, bypassing converter assembly 420. Such bypassing may be activated if the bidirectional power converter or battery might compromise the integrity of the converter stack.

FIG. 4C is a schematic diagram of another example configuration 430 of a bidirectional power converter with a battery, according to an example embodiment. In this example configuration 430, a combination of switching devices is incorporated such that the converter assembly 430 may operate in various modes, including the following: the bidirectional power converter connected to the stack, the battery connected to the stack, and bypassing both the bidirectional power converter and the battery.

FIG. 4D is a schematic diagram of an example configuration 440 of a bidirectional power converter with a voltage converter, according to an example embodiment. In this example configuration 440, the battery is connected to the DC terminals of a bidirectional power converter through a voltage converter formed from a capacitor, inductor, diode, and a switch (which collectively form a buck-boost converter). The example voltage converter may facilitate the conversion from the battery's operational voltage level to a higher or lower voltage level. For example, the battery may operate at 120 V, while the bidirectional power converter is configured to operate at 240 V; in this example, the voltage converter may perform DC-DC conversion by a factor of 2, such that the battery effectively provides approximately the same 240 V output as the bidirectional power converter.

In various implementations, voltage converters may perform voltage conversion in two directions (to allow for both charging and discharging of the battery using DC power that is of a different voltage level than the battery). Additionally, other DC-DC voltage converters may be used, which may utilize switches, voltage regulators, and other electronic components to facilitate the voltage conversion.

It should be understood that the example converter assemblies in FIGS. 4A, 4B, and 4C are merely examples provided for explanatory reasons. Other bypass and switching techniques may be utilized in order to provide battery redundancy of bidirectional power converters in a bidirectional power converter stack, without departing from the scope of the present application.

B. Battery Integrated within the Bidirectional Power Converter

Figure 5A:
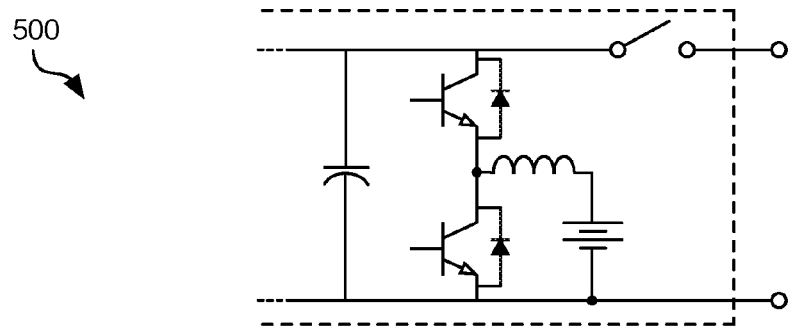
FIG. 5A is a schematic diagram of an example configuration of a battery-integrated bidirectional power converter, according to an example embodiment.
Figure 5B:
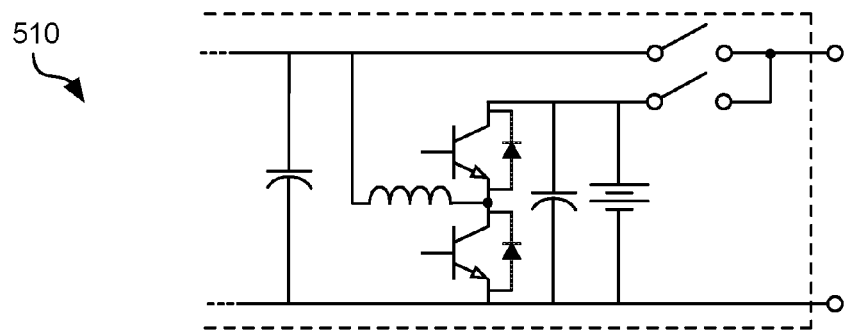
FIG. 5B is a schematic diagram of another example configuration of a battery-integrated bidirectional power converter, according to an example embodiment.
Figure 5C:
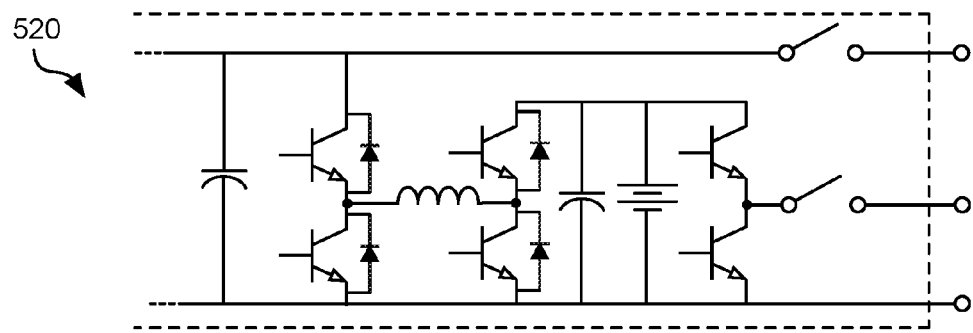
FIG. 5C is a schematic diagram of yet another example configuration of a battery-integrated bidirectional power converter, according to an example embodiment.

FIG. 5A is a schematic diagram of an example configuration 500 of a battery-integrated bidirectional power converter, according to an example embodiment. In FIGS. 5A, 5B, and 5C, the schematic drawing illustrates example circuits that can be included on the DC side of a bidirectional power converter. The top and bottom rails of the schematic drawings form the DC bus. The left side of the schematic drawings may lead to the transistor bridge that acts as an inverter to generate the AC voltage, and right side of the schematic drawings may represent the DC input and/or output lines (to which a tether may be electrically coupled, for example).

In one example scenario, DC power (converted from AC power by a rectifier bridge to the left of example configuration 500, not illustrated in FIG. 5A) may be lost or attenuated, such that the DC bus is unable to provide an adequate amount of voltage and/or current to devices drawing power from the DC bus. For instance, AC power may be lost (e.g., due to a loss of connection to an AC grid, a component failure, etc.), causing the DC voltage produced by the rectifier bridge to drop. In this scenario, the switches in the configuration 500 may be activated to electrically couple the battery to the DC bus, causing the battery to drive the DC bus voltage and act as a power source for devices drawing power from that DC bus.

In some instances, switching may be performed so that the combination of the battery, inductor, switches, and diodes act as a buck converter and/or as a boost converter. For example, switching may be carried out that converts the battery's voltage up or down in order to drive a desired voltage on the DC bus. As one example, if the battery voltage is 12 V, but the DC bus is designed to provide 700 V, switching may be carried out to facilitate the DC voltage up-conversion. The rate of switching (i.e., the switching frequency) may depend upon a number of factors, including the capacitance of the parallel capacitor, the inductance of the series inductor, and/or the performance capabilities of the transistors, among other factors.

The switching bridge, diodes, and inductor may also charge the battery. In some embodiments, excess power not consumed by the load connected to the DC bus may be routed to the battery to charge the battery. In the reverse direction, excess power provided by a DC-side power source (e.g., motor-generators acting as generators) may be routed to the battery for charging. Furthermore, regardless of whether excess power is available or not, a portion of the available power may be routed to the battery for charging to ensure that the battery is fully charged or at least sufficiently charged (e.g., above a threshold charge level). Additional controllers, sensors, and/or circuitry may be incorporated within a bidirectional power converter for determining whether or not the battery is to be charged, and to effect switching in order to carry out that charging.

In one instance, loss of AC power may cause the battery to begin driving the DC bus. The battery may act as a temporary power source to allow devices connected to the DC bus to safely conclude their operation. For example, if an AWT is airborne when AC power is lost, the battery (or multiple batteries) may begin supplying power to the AWT, and the AWT may be instructed to safely descend back to the ground. In this manner, loss of AC power might be mitigated while substantially reducing the risk of damaging an AWT.

In another instance, it may be desired to mitigate fluctuations in DC power provided by generating devices connected to the DC bus; such fluctuations may be in violation of certain regulations or agreed-upon power supply standards, or may be too large to provide a steady and predictable source of power. These fluctuations may be cause by, for example, changes in wind speed incident on an AWT. In these circumstances, the battery may act as a supplemental power source to compliment dips in the DC power and diminish the swings in the DC voltage. The battery may fully drive the DC bus, and in turn the inverter, to generate the AC power. Alternatively, power from the battery may be dynamically combined with power from another DC source, such that the combination of the DC power sources provides for a more stable DC power source (and thus more stable AC power to the grid, for example).

FIG. 5B is a schematic diagram of another example configuration 510 of a battery-integrated bidirectional power converter, according to an example embodiment. In this example configuration 510, one of the DC lines may be selectively driven by either a rectifier bridge (not illustrated) or the battery. In this example, the battery may be of an adequate DC voltage level so that it does not need any up-conversion or down-conversion before being electrically coupled to the DC bus.

FIG. 5C is a schematic diagram of yet another example configuration 520 of a battery-integrated bidirectional power converter, according to an example embodiment. In this example configuration 520, the bidirectional power converter includes three output lines: a positive DC output line coupled to the rectifier bridge (not pictured), a positive battery voltage line (the middle output line in FIG. 5C), and a ground line. External circuitry may be configured to selectively couple to either the positive DC output line, or the positive battery voltage line; such circuit may, for example, couple to the positive DC output line during normal operation, and couple to the positive battery voltage line while the system is experiencing a fault.

Regardless of the particular implementation (e.g., no converter, buck converter, boost converter, buck-boost converter, etc.), it should be understood that a battery backup may be incorporated on the DC side of a bidirectional power converter. Additionally, battery-integrated bidirectional power converters may be coupled to external parallel batteries (e.g., as illustrated in FIGS. 4A, 4B, and 4C) for additional redundancy.

V. CONCLUSION

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A power distribution system comprising:
   an alternating current (AC) power bus;
   a direct current (DC) power bus electrically coupled to one or more motor-generators;
   a bidirectional power converter including AC terminals and DC terminals, wherein the bidirectional power converter is operable to (i) convert AC power received at the AC terminals to DC power at the DC terminals and (ii) convert DC power received at the DC terminals to AC power at the AC terminals, wherein the bidirectional power converter is disposed within a converter stack formed by a plurality of power converters having DC terminals that are coupled to each other in series, and wherein ends of the converter stack define the DC power bus;
   a battery arranged to be selectively couplable to the DC terminals of the bidirectional power converter; and
   a controller configured to:
      determine that the DC voltage across the DC terminals of the bidirectional power converter is below a threshold voltage; and
      based on the determination that the DC voltage is below the threshold voltage, coupling the battery to the DC terminals of the bidirectional power converter.

2. The power distribution system of claim 1, wherein the battery is selectively couplable to the DC terminals through a switching device, and wherein coupling the battery to the DC terminals comprises causing the switching device to begin conducting.

3. The power distribution system of claim 2, wherein the switching device comprises a transistor.

4. The power distribution system of claim 2, wherein the switching device comprises a relay.

5. The power distribution system of claim 1, wherein the system further comprises bypass circuitry arranged in parallel with the DC terminals, and wherein the bypass circuitry is configured to selectively decouple the bidirectional power converter from the converter stack.

6. The power distribution system of claim 5, wherein the bypass circuitry is further configured to selectively decouple the battery from the converter stack.

7. The power distribution system of claim 5, wherein the bypass circuitry includes a switching bridge comprising at least two switching devices.

8. The power distribution system of claim 1, wherein the bidirectional power converter is configured to drive the DC voltage across the DC terminals at a first voltage level, wherein the battery operates at a second voltage level, and wherein the system further comprises a voltage converter configured to convert the battery output from the second voltage level to the first voltage level.

9. The power distribution system of claim 1, wherein the DC terminals of the bidirectional power converter is selectively couplable to the converter stack, and wherein the controller is further configured to:
based on the determination that the DC voltage is below the threshold voltage, decoupling the DC terminals of the bidirectional power converter from the converter stack.

10. The power distribution system of claim 1, wherein the controller is further configured to:
determine that the bidirectional power converter is faulted; and
based on the determination that the bidirectional power converter is faulted, coupling the battery to the DC terminals of the bidirectional power converter.

11. A method comprising:
providing a plurality of bidirectional power converters each operable (i) in a first mode to convert AC power received at AC terminals to DC power at DC terminals and (ii) in a second mode to convert DC power received at the DC terminals to AC power at the AC terminals, wherein the DC terminals of the plurality of bidirectional power converters are coupled to each other in series to form a converter stack, wherein ends of the converter stack define a DC power bus, and wherein each bidirectional power converter contributes a respective portion of a voltage of the DC power bus in the first mode;
determining that a DC voltage across the DC terminals of a particular bidirectional power converter within the converter stack is below a threshold voltage; and
based on the determination that the DC voltage is below the threshold voltage, (i) causing the particular bidirectional power converter to stop contributing a first portion of the voltage of the DC power bus and (ii) causing a battery to begin contributing the first portion of the voltage of the DC power bus.

12. The method of claim 11, wherein causing the battery to begin contributing to the first portion of the voltage of the DC power bus comprises causing a switching device that selectively couples the battery to the DC terminals to begin conducting.

13. The method of claim 11, further comprising:
receiving an indication that a fault has occurred at the bidirectional power converter; and
responsive to receiving the indication, causing the particular bidirectional power converter to stop contributing a first portion of the voltage of the DC power bus and (ii) causing a battery to begin contributing the first portion of the voltage of the DC power bus.

14. The method of claim 13, wherein the indication is received responsive to a failure of at least one component of the bidirectional power converter.

15. The method of claim 11, further comprising:
determining that an AC voltage across the AC terminals of the plurality of bidirectional power converters is below a threshold voltage; and
based on the determination that the AC voltage is below the threshold voltage, causing a respective plurality of batteries to drive the voltage of the DC power bus.

16. The method of claim 11, wherein the particular bidirectional power converter is configured to output a first voltage, wherein the battery is configured to output a second voltage, and wherein the method further comprises:
converting the battery output from the second voltage to the first voltage.

17. A converter stack including a plurality of bidirectional power converters, a particular bidirectional power converter of the plurality comprises:
AC terminals electrically coupled to an AC power system;
DC terminals electrically coupled in series with DC terminals of one or more bidirectional power converters in the converter stack, wherein ends of the converter stack define a DC power bus, and wherein the DC terminals of the particular bidirectional power converter contribute a DC voltage to the DC power bus;
a bidirectional conversion bridge configured to (i) convert AC power received at the AC terminals to DC power at the DC terminals and (ii) convert DC power received at the DC terminals to AC power at the AC terminals; and
a battery configured to selectively couple to the DC terminals responsive to the DC voltage across the DC terminals being below a threshold voltage.

18. The converter stack of claim 17, wherein the battery is selectively couplable to the DC terminals through a switching device, and wherein coupling the battery to the DC terminals comprises causing the switching device to begin conducting.

19. The converter stack of claim 17, wherein the battery is further configured to selectively couple to the DC terminals responsive to detecting a loss of the AC power received at the bidirectional conversion bridge.

20. The converter stack of claim 17, wherein the bidirectional power bridge is further configured to output DC power at a first voltage level, wherein the battery is configured to output DC power at a second voltage level, and wherein the particular bidirectional power converter further comprises a voltage converter configured to convert the battery output from the second voltage level to the first voltage level at the DC terminals.

* * * * *